(12) United States Patent
Deskevich et al.

(10) Patent No.: US 9,342,760 B1
(45) Date of Patent: *May 17, 2016

(54) SYSTEM AND METHOD FOR COMBINING COLOR INFORMATION WITH SPATIAL INFORMATION IN MULTISPECTRAL IMAGES

(71) Applicant: Exelis Inc., McLean, VA (US)

(72) Inventors: Michael Paul Deskevich, Boulder, CO (US); Christopher Padwick, Longmont, CO (US)

(73) Assignee: Exelis Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,369

(22) Filed: Mar. 2, 2015

Related U.S. Application Data

(63) Continuation of application No. 13/452,011, filed on Apr. 20, 2012, now Pat. No. 9,020,256.

(60) Provisional application No. 61/478,192, filed on Apr. 22, 2011.

(51) Int. Cl.
*G06K 9/62* (2006.01)
*G06T 5/00* (2006.01)
*G06K 9/00* (2006.01)

(52) U.S. Cl.
CPC ............ *G06K 9/6289* (2013.01); *G06K 9/0063* (2013.01); *G06T 5/001* (2013.01); *G06T 5/003* (2013.01); *G06T 2207/10024* (2013.01); *G06T 2207/10036* (2013.01); *G06T 2207/10041* (2013.01); *G06T 2207/20021* (2013.01)

(58) Field of Classification Search
None
See application file for complete search history.

(56) References Cited

U.S. PATENT DOCUMENTS 8,737,733 B1 5/2014 Padwick
2004/0234126 A1* 11/2004 Hampshire et al. ........... 382/162

OTHER PUBLICATIONS

Konstantinos et al. "Comparison of Nine Fusion Techniques for Very High Resolution Data," 2008.*
Rahmani et al. "An Adaptive IHS Pan-sharpening Method," Mar. 2010.*
Ashton et al. "A Novel Method for Illumination Suppression in Hyperspectral Images," 2008.*

* cited by examiner

*Primary Examiner* — Vu Le
*Assistant Examiner* — Alexander J Lesnick
(74) *Attorney, Agent, or Firm* — Davidson Berquist Jackson & Gowdey, LLP

(57) ABSTRACT

An image processing system combines higher-resolution panchromatic images and lower resolution multispectral images using a hyperspherical color space pan-sharpening technique. By converting the multispectral images into a hyperspherical color space, the intensities of the multispectral images can be intensity matched to the intensities of the panchromatic image and then retransformed back to the original color space. The intensity matching can utilize a number of techniques, including, but not limited to, direct substitution of the intensities of the panchromatic image for the intensities of the multispectral images, modification of the intensities of the multispectral images based on predefined statistical models and modification of the intensities of the multispectral images based on dynamically generated statistical models and a selected sharpening parameter β.

12 Claims, 16 Drawing Sheets
(14 of 16 Drawing Sheet(s) Filed in Color)

SYSTEM AND METHOD FOR COMBINING COLOR INFORMATION WITH SPATIAL INFORMATION IN MULTISPECTRAL IMAGES

CROSS REFERENCE TO CO-PENDING APPLICATIONS

The present application is a continuation of U.S. patent application Ser. No. 13/452,011, filed Apr. 20, 2012, which claims the benefit under 35 U.S.C. 119 of U.S. Provisional Patent Application Ser. No. 61/478,192, filed Apr. 22, 2011. The contents of those applications are incorporated herein by reference in their entirety.

FIELD OF INVENTION

The present invention is directed to a system and method for combining panchromatic image information with multispectral image information, and in one embodiment to a system and method for utilizing hyperspherical color space pan-sharpening with higher-resolution panchromatic images and lower resolution multispectral images.

DISCUSSION OF THE BACKGROUND

Known commercial satellites collect multispectral bands at a lower resolution than the panchromatic band. The WorldView-2 (WV-2) satellite, launched by DigitalGlobe on Oct. 8, 2009 represents the first commercial imaging satellite to collect very high spatial resolution data in 8 spectral bands. The multispectral bands cover the spectral range from 400 nm-1050 nm at a 1.84 m spatial resolution, while the panchromatic band covers the spectrum from 450 nm-800 nm with 4× greater spatial resolution, 0.46 m. The relative spectral responses from each band are shown in FIG. 1.

It is often desired to have the high spatial resolution and the high spectral resolution information combined in the same file. Pan-sharpening is a type of data fusion that refers to the process of combining the lower-resolution color pixels with the higher resolution panchromatic pixels to produce a high resolution color image. Pan-sharpening techniques are known in the art. See, for example, Nikolakopoulos, K.G, Comparison of Nine Fusion Techniques For Very High Resolution Data, PE&RS, May 2008, incorporated herein by reference. One class of techniques for pan-sharpening is called "component substitution," where generally involves the following steps:
  Upsampling: the multispectral pixels are upsampled to the same resolution as the panchromatic band (which may require data alignment when the multispectral images are not obtained from the same sensor as the panchromatic images).
  Forward Transform: the upsampled multispectral pixels are transformed from the original values to a new representation, which is usually a new color space where intensity is orthogonal to the color information.
  Intensity Matching: the multispectral intensity is matched to the panchromatic intensity in the transformed space. Often a histogram-matching process is employed to minimize the differences between the panchromatic intensity and the component being replaced.
  Reverse Transform: the reverse transformation is performed using the substituted intensity component to transform back to the original color space.

In cases where the multispectral and panchromatic intensities are perfectly interchangeable, the resulting imagery will have the same sharpness as the original panchromatic image as well as the same colors as the original multispectral image. In practice, however, it is often impossible to meet both of these goals and one often trades sharpness for color recovery or vice-versa. A significant factor that affects the color recovery in the resulting image is how well the forward transformation models the relationship between the panchromatic and multispectral bands.

A very simple component substitution technique for pan-sharpening is called the Hue-Intensity-Saturation (HIS) sharpening technique, which utilizes the well-known HIS color space. The conversion from the RGB color space to HIS color space is described in Tu, T. M., Huang, P. S., Hung, C. L., Chang, C. P., A Fast Intensity-Hue-Saturation Fusion Technique With spectral Adjustment for IKONOS Imagery, IEEE Geoscience and Remote Sensing Letters, Vol 1, No 4, October 2004, incorporated herein by reference. The HIS color space has the advantage that the three components are orthogonal, thus manipulating one component does not affect the other components. In the HIS color space, the intensity component ("I") is a simple average of the three color components:

$$I = \frac{1}{3}(R + G + B) \qquad \text{Equation 1}$$

where R indicates the pixel value for the red band, G indicates the pixel value for the green band, and B indicates the pixel value for the blue band. However, the multispectral intensity as represented above can be a poor match for the panchromatic band, even after intensity matching is applied, resulting in poor color reproduction in the sharpened image, as is described in Tu, T. M., Su, S. C., Shyu, H. C., Huang, P. S., A new look at HIS-like image fusion methods, Information Fusion 2, (2001), 177-186, incorporated herein by reference.

In most cases, the panchromatic intensity is not modeled well by this equation, and the resulting color distortion makes the resulting product undesirable. There are two main reasons why the HIS method does not work well for these images:
  The HSI model presumes a single device dependent wavelength for each of R, G and B when defining the transformation RGB to HSI, while the imagery is taken with sensors responding to bands of wavelengths in each of the R, G, and B regions (i.e., the HSI transformation assumes an infinitely narrow color response);
  The HIS model only includes the values of the R, G, and B bands in the transformation, while the imagery may include more bands of color information, e.g., the QuickBird images also include Near IR information.

As shown in FIG. 1 and FIG. 2, the multispectral coverage of the red, green, and blue bands does not cover the full spectrum of the panchromatic band for the WV-2 and QuickBird satellites. In this case a simple component substitution technique is expected to suffer from some color distortion. As described in Strait, M., Rahmani, S., Markurjev, D., Wittman, T. August 2008, Evaluation of Pan-Sharpening Methods, Technical Report, UCLA Department of Mathematics, to minimize this color distortion, it is possible to model the panchromatic intensity from the multispectral bands and employ an equation as follows:

$$I_k = \sum_{i=1}^{N} C_i MS_{ik} \qquad \text{Equation 2}$$

where k indicates a specific pixel in the image, $MS_{ik}$ indicates the multispectral pixel for band i and location k in the image (typically derived from the upsampled image, at the same native resolution image as the panchromatic band), I is a "model" of the panchromatic band, and C is a vector of constants.

The constants, C, can be computed by statistical means. One problem with the technique, however, is that the determination of these constants is often time consuming as it may require a lot of computation. For example, the full pan-multispectral covariance matrix is required to be computed in Zhang, Y., Understanding Image Fusion, Photogrammetric Engineering and Remote Sensing, 70(6):657-661, 2004, the contents of which are incorporated herein by reference. The constants can also be determined by computing the exact spectral overlap of each multispectral band with the panchromatic band. In this case the constants must be computed separately for each sensor under consideration and this requires access to the detailed spectral response curves from the satellite provider, and such information may not be readily available.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following description, given with respect to the attached drawings, may be better understood with reference to the non-limiting examples of the drawings, wherein:

FIGS. 6-11 are a series of pan sharpening images using various band combinations;

FIG. 12 is an exemplary panchromatic image;

FIG. 13 is an exemplary multispectral image corresponding to the image of FIG. 12;

FIG. 14 is an HIS Sharpened image corresponding to the image of FIG. 12;

FIG. 15 is a PCA sharpened image corresponding to the image of FIG. 12;

FIG. 16 is a Gramm-Schmidt sharpened image corresponding to the image of FIG. 12;

FIG. 17 is a HCS sharpened image corresponding to the image of FIG. 12 having been processed by an HCS sharpening technique described herein;

DISCUSSION OF THE PREFERRED EMBODIMENTS

As described herein, higher resolution panchromatic image information can be combined with multispectral image information corresponding to images from the same area as the panchromatic image information (i.e., the multispectral image information and the panchromatic image information correspond to "cogeolocated" images) to provide an enhanced image having a resolution of the panchromatic image information but with the color information of the multispectral image information. This technique can be implemented to operate on an arbitrary number of input bands, and thus the technique is well suited for sharpening the 8-band WV-2 imagery. Furthermore, the technique is capable of being parallelized across a number of threads, cores, processors and/or computers to achieve increased processing of the multiple bands.

Figure 1:
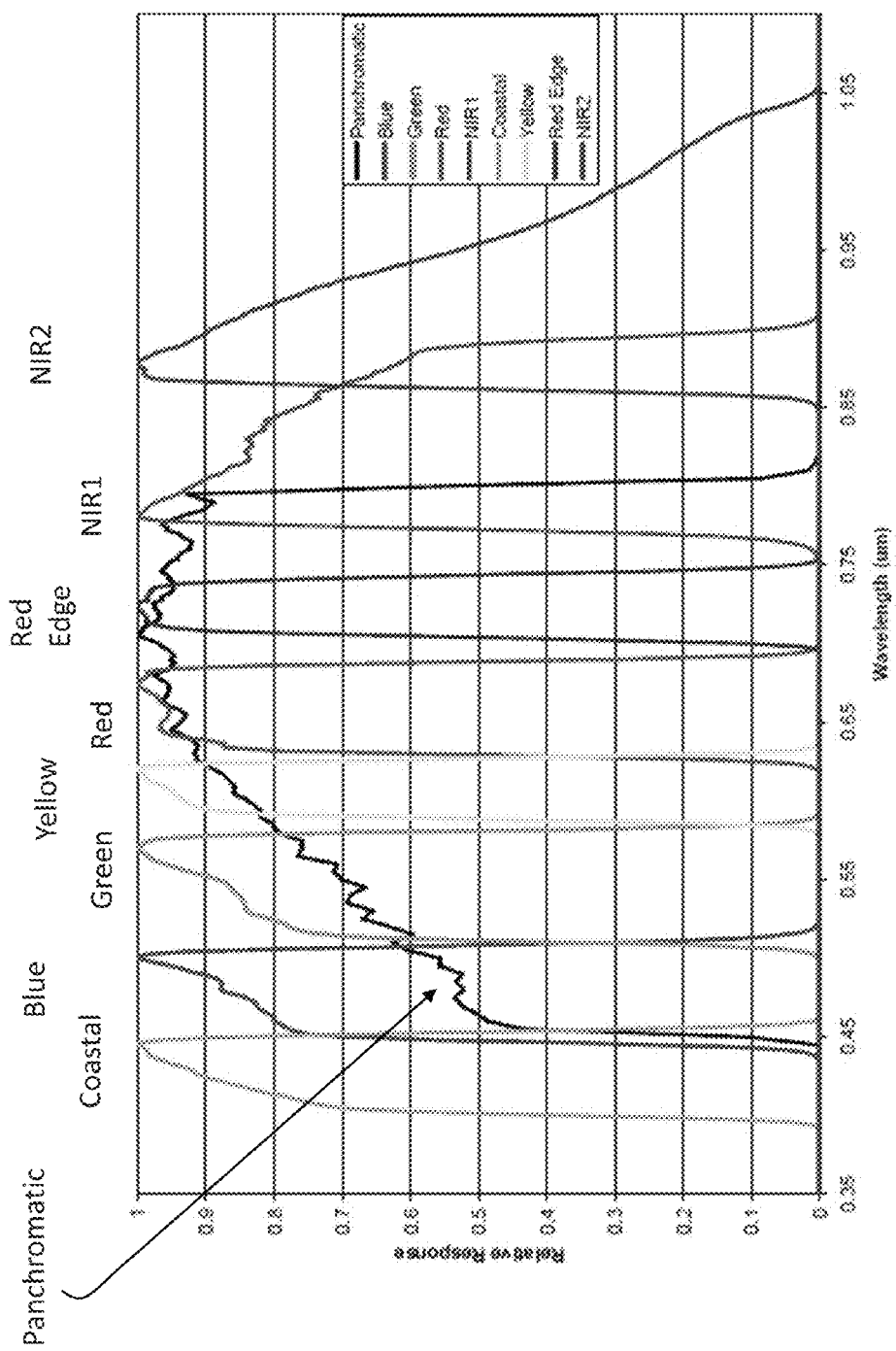
FIG. 1 is graph illustrating the relative spectral responses of the WV-2 satellite.
Figure 2:
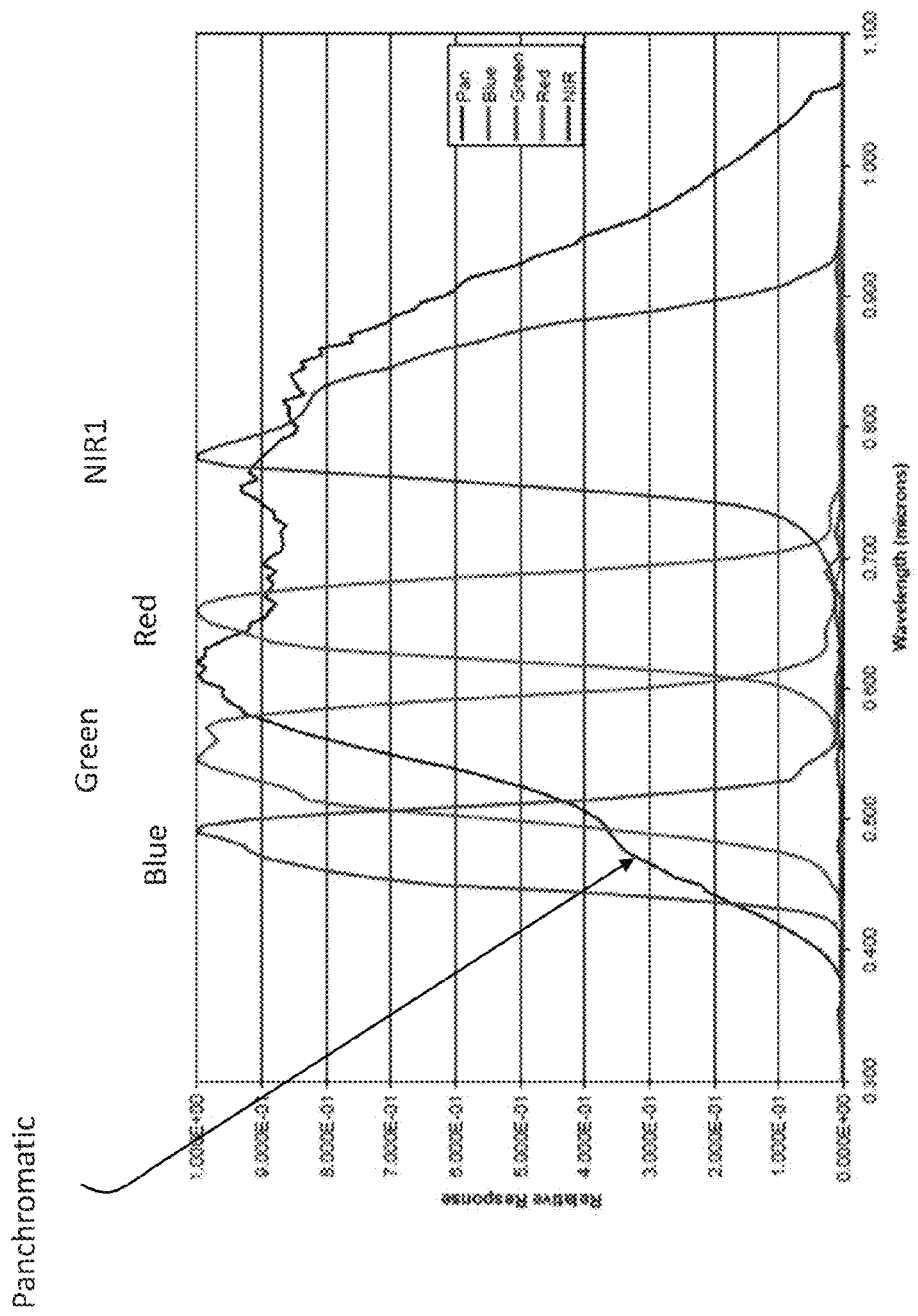
FIG. 2 is graph illustrating the relative spectral response of the QuickBird satellite.
Figure 3:
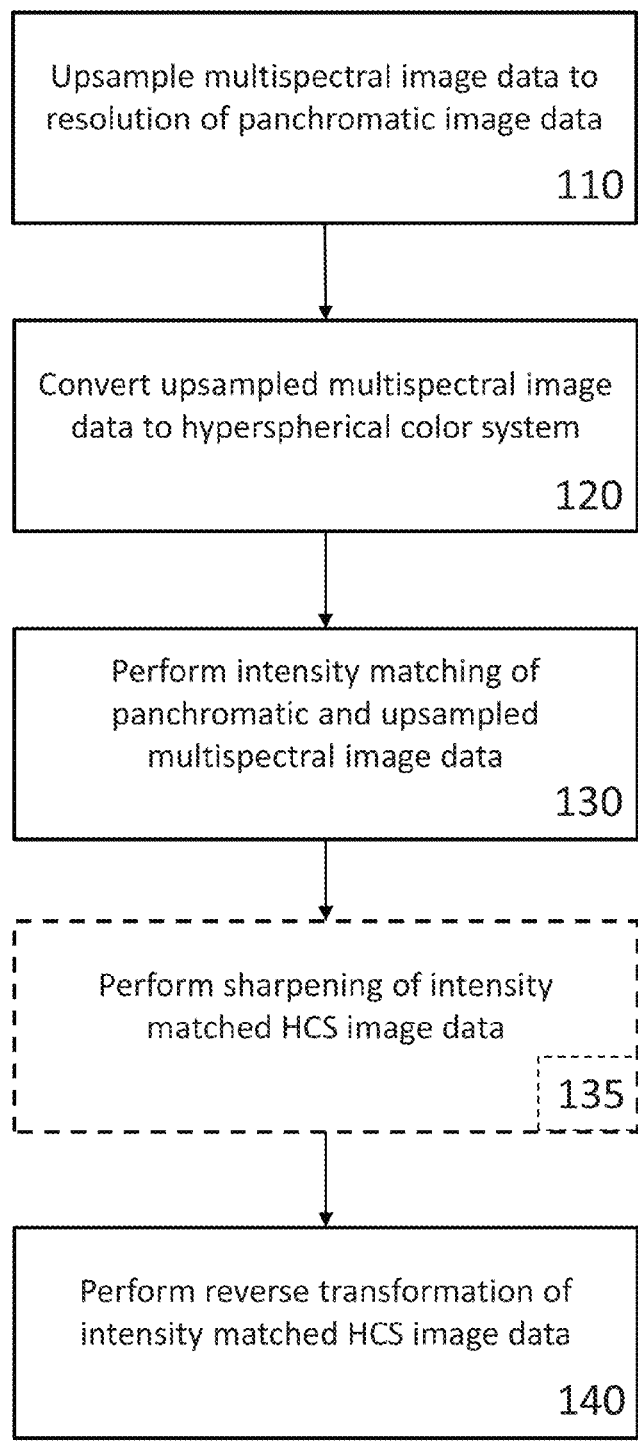
FIG. 3 is a flowchart showing the general operation of a data combination method according to the present invention.

As shown in FIG. 3, the data combination method according to the present invention utilizes four main processing steps when combining at least a portion of a panchromatic image with corresponding cogeolocated portions of various multispectral images. As described herein, the processing can be performed on blocks within an image without having to perform transformations on an entire image. Moreover, processing can be performed on images of any resolution. In embodiments where a satellite image includes multiple resolutions of the same image within the same or multiple files, some processing may be performed at a first resolution (e.g., statistical analysis is performed on a low resolution version of blocks from the image) while other processing is performed at a second resolution (e.g., final image combination of all blocks in the image is performed at the highest resolution). However, as would be understood by those of ordinary skill in the art, the use of the term "image" is to be understood to be one or more blocks of image data grouped together, and it is not intended to be limited to all data captured by a particular sensor at a particular time or only data captured by a particular sensor at a particular time. Image data from multiple image captures can be combined together to form a single image, and a single image can be cropped to a smaller image or split into several images without a loss of generality.

In the step 110 of the imagery combination method of FIG. 3, a block of multispectral image data is upsampled to the same spatial resolution as the panchromatic image data that it is going to be matched to. Any upsampling technique can be used to match the lower resolution multispectral image data to the higher resolution panchromatic image data. In a first upsampling technique, a nearest neighbor or zero order hold technique can be used where data from the lower resolution multispectral image data is duplicated a number of times for each of the corresponding positions in a resulting higher resolution image. For example, if the lower resolution image was one fourth the resolution of the higher resolution image (by being half the resolution in each of the horizontal and vertical directions), then each pixel in the lower resolution image block would be duplicated four times in the resulting higher resolution image. In another embodiment, linear interpolation of the lower resolution image data can be used to smooth the transition between pixels in the higher resolution. Similarly, non-linear interpolation (e.g., cubic interpolation) can also be used.

In step 120 of FIG. 3, the transformation between the native color space and the hyperspherical color space is performed pixel-by-pixel and utilizes a transformation from the standard n-dimensional Cartesian space to an n-dimensional hyperspherical color space (HCS). For an image with N input bands, a single intensity component and N−1 angles on the hypersphere are formed. The general transformation of a corresponding pixel into the HCS from an N-band color space is given by the following equations:

$$I = \sqrt{X_n^2 + X_{n-1}^2 + \ldots + X_1^2} \quad \text{Equation 3}$$

$$\varphi_1 = \tan^{-1}\left(\frac{\sqrt{X_n^2 + X_{n-1}^2 + \ldots + X_2^2}}{X_1}\right) \quad \text{Equation 4}$$

$$\varphi_{n-2} = \tan^{-1}\left(\frac{\sqrt{X_n^2 + X_{n-1}^2}}{X_{n-2}}\right) \quad \text{Equation 5}$$

$$\varphi_{n-1} = \tan^{-1}\left(\frac{X_n}{X_{n-1}}\right) \quad \text{Equation 6}$$

where $X_i$ is the $i^{th}$ component of the native color space.

In step 130 of FIG. 3, an intensity matching method, described in greater detail below, is performed to determine an adjusted intensity ($I_{adj}$) which matches, to varying degrees, the intensity of the panchromatic image data with the intensity of the HCS image data.

In step 140 of FIG. 3, the reverse transformation is performed according to:

$$X_1 = I_{adj} \cos \phi_1 \quad \text{Equation 7}$$

$$X_2 = I_{adj} \sin \phi_1 \cos \phi_2 \quad \text{Equation 8}$$

$$X_{n-1} = I_{adj} \sin \phi_1 \sin \phi_2 \ldots \sin \phi_{n-2} \cos \phi_{n-1} \quad \text{Equation 9}$$

$$X_n = I_{adj} \sin \phi_1 \sin \phi_2 \ldots \sin \phi_{n-2} \sin \phi_{n-1} \quad \text{Equation 10}$$

Accordingly, for pixels in a four-band image consisting of Blue, Green, Red and Near IR (BGRN) such as is used in a 4-band QuickBird image, the transformation of pixels is:

$$I = \sqrt{N^2 + R^2 + G^2 + B^2} \quad \text{Equation 11}$$

$$\varphi_1 = \tan^{-1}\left(\frac{\sqrt{N^2 + R^2 + G^2}}{B}\right) \quad \text{Equation 12}$$

$$\varphi_2 = \tan^{-1}\left(\frac{\sqrt{N^2 + R^2}}{G}\right) \quad \text{Equation 13}$$

$$\varphi_3 = \tan^{-1}\left(\frac{N}{R}\right) \quad \text{Equation 14}$$

Likewise, for the four-band BGRN image, the reverse transformation is:

$$B = I_{adj} \cos \phi_1 \quad \text{Equation 15}$$

$$G = I_{adj} \sin \phi_1 \cos \phi_2 \quad \text{Equation 16}$$

$$R = I_{adj} \sin \phi_1 \sin \phi_2 \cos \phi_3 \quad \text{Equation 17}$$

$$N = I_{adj} \sin \phi_1 \sin \phi_2 \sin \phi_3 \quad \text{Equation 18}$$

In the transformation to HCS, the angular ($\phi_n$) variables define the color or hue while the radial (I) component defines the intensity of the color. Once transformed into HCS, the intensity can be scaled without changing the color.

Figure 4:
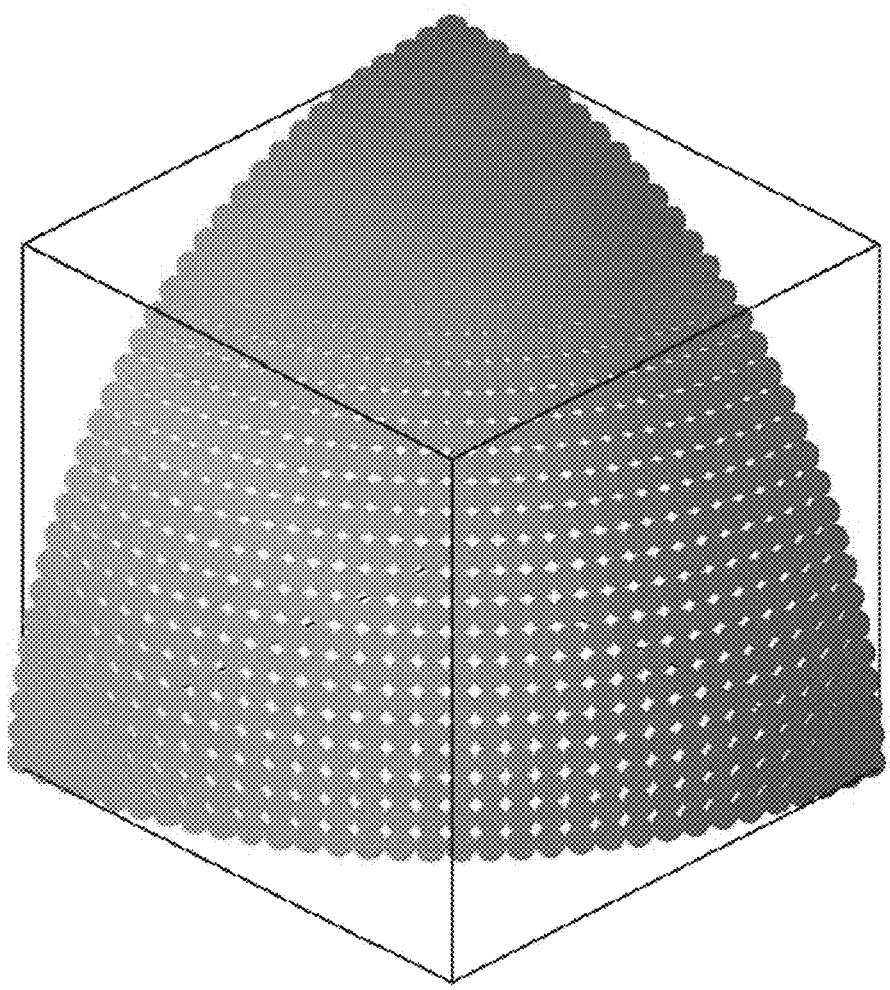
FIG. 4 is an illustration of a transformation from RGB to hyperspherical color space (HCS) at constant intensity.

The transformation to HCS can be made from any native color space (or pseudo color space in the case of pan-colorization). An example transformation is given in FIG. 4 where RGB is transformed into HCS and plotted as a function of ($\phi_1$) and ($\phi_2$) at constant intensity. FIG. 4 is a shell of constant radius (intensity) in the positive octant. As all color components are positive, the angular components of HCS span the space [0, π/2]. At ($\phi_1$, $\phi_2$)=(0,0), the HCS represents pure red. As $\phi_1$ is swept down to 90°, the color changes along with what would be the red-green axis in the RGB space, and sweeping $\phi_2$ is equivalent to movement along the green-blue axis in the RGB space. Intensity is represented as the distance from the origin, which is constant in FIG. 4. Thus, the transformation into HCS is generalizable, and the final result depends on the native color space.

As described above, the HCS data combination can be implemented with a variety of intensity matching techniques in step 130. In a first embodiment, the multispectral intensity component I(x,y) for a pixel (x,y) in a block is replaced by the intensity of the corresponding pixel in the panchromatic image block P(x,y) such that $I_{adj}$(x, y)=P(x, y).

In a second embodiment, statistical characteristics of the panchromatic image and/or the multispectral images are determined to attempt to better match the intensities of the panchromatic and multispectral images. In a first statistical-based technique, the mean and standard deviation of the square of the multispectral intensity are calculated where the multispectral intensity is given by:

$$I^2 = \sum_{i=1}^{N} X_i^2 \quad \text{Equation 19}$$

Similarly, the mean and standard deviation for the square of the intensity of the panchromatic image ($P^2$=(Pan)$^2$) are also calculated. Let the mean and standard deviation of $P^2$ be denoted by $\mu_p$ and $\sigma_p$ and let the mean and standard deviation of $I^2$ be denoted by $\mu_i$ and $\sigma_i$. These quantities often can be computed from a lower resolution version of the corresponding images (e.g., using a 1024×1024 pixel "thumbnail") to save time.

The $P^2$ signal can then be intensity matched to the $I^2$ signal for each pixel (x,y) using the following equation that simply scales the panchromatic intensity to the multispectral intensity in a way that preserves the multispectral statistics:

$$P'^2(x, y) = \frac{\sigma_i}{\sigma_p}(P^2(x, y) - \mu_p + \sigma_p) + \mu_i - \sigma_i \quad \text{Equation 20}$$

The sharpening step is performed by forming the adjusted intensity by taking the square root of the P'² band as follows:

$$I_{adj}(x, y) = \sqrt{P'^2(x, y)} \quad \text{Equation 21}$$

The resulting $I_{adj}$ is the pan-sharpened intensity.

In yet another embodiment of step 130, filtering is performed on the panchromatic image data prior to calculating the adjusted intensity. In one embodiment a smoothed version of the panchromatic band ($Pan_{smooth}$) is formed by using a sliding window convolution filter (e.g., performed with a square window, such as a 7×7 window) in which the value of the middle output pixel is the mean of all pixels in the window. The dimensions of the window may be adjusted to any size or shape (usually symmetric about the center point). Other exemplary sizes and shapes include a 5×5 window, and 8×8 window or a hexagon having top and bottom widths of a first number of pixels and a center width of a second number of pixels, larger than the first number. However, the fewest spatial artifacts in the resulting pan-sharpened image were observed when the size of the window was set to 7×7.

Next the mean and standard deviation are computed of both the square of $P_{smooth}$ band $P_S^2$ and the square of the multispectral intensity ($I^2$), given by:

$$I^2 = \sum_{i=1}^{N} X_i^2 \quad \text{Equation 22}$$

$$P_S^2 = (P_{smooth})^2$$

Let the mean and the standard deviation of $P_S^2$ be denoted by $\mu_{ps}$ and $\mu_{ps}$ and let the mean and the standard deviation of $I^2$ be denoted by $\mu_i$ and $\sigma_i$. (As in earlier statistical modeling techniques, computation of the mean and standard deviation can be computed using a lower resolution image to save time.)

Next, $P'^2$ and the $P_S^2$ signal are intensity matched using the following equations:

$$P_S'^2(x, y) = \frac{\sigma_i}{\sigma_p}(P^2(x, y) - \mu_p + \sigma_p) + \mu_i - \sigma_i \quad \text{Equation 23}$$

$$P'^2(x, y) = \frac{\sigma_i}{\sigma_p}(P^2(x, y) - \mu_p + \sigma_p) + \mu_i - \sigma_i$$

The adjusted intensity can then be calculated according to:

$$I_{adj}(x, y) = \sqrt{\frac{P'^2(x, y)}{P_S'^2(x, y)} I^2(x, y)} \quad \text{Equation 24}$$

The resulting $I_{adj}$ is the adjusted intensity that incorporates the non-uniform contribution of the multispectral bands to the intensity.

It is desired to utilize a pan-sharpening technique that exhibits excellent spatial quality (i.e. recovery of edges) and also maintains the colors of the original multispectral image.

In addition to generating P'² using the above equations, it is also possible to generate it by using a set of spectrum-specific coefficients that are selected to represent the contribution of each corresponding spectrum to the panchromatic band. For example, using a blue-green-red-near IR (BGRN) color space, an artificial or synthetic panchromatic band can be generated according to the following:

$$P_{synth}^2(x,y) = bB^2(x,y) + gG^2(x,y) + rR^2(x,y) + nN^2(x,y),$$

where b, g, r and n are the spectrum-specific coefficients. The spectrum-specific coefficients may be known a priori (e.g., based on coefficients previously determined for a particular type of satellite under a particular type of conditions) or may be generated dynamically. If the coefficients are to be calculated, they can be calculated statistically or by determining an amount of overlap between the bands within the panchromatic band. When calculating the coefficients utilizing an amount of overlap between the bands within the panchromatic band, the system determines for each coefficient $c_i$:

$$c_i = \frac{K_i \times \int \text{Min}(P_{sr}, MS_{i,sr})}{K_P}$$

where $K_i$ is the factor for the i-th MS band which converts digital numbers to units of radiance, $K_P$ is the factor for the panchromatic band that converts digital numbers to units of radiance, $P_{sr}$ is the measured spectral response of the panchromatic band, $MS_{i,sr}$ is the measured spectral response for the i-th MS band, and $\text{Min}(P_{sr}, MS_{i,sr})$ represents the minimum value of either argument, such that the integral is carried out to determine the minimum amount of spectral overlap between the i-th band and the panchromatic band.

The integral method works well for a general image and can be used to find a default set of coefficients; however, when adjacent bands have significant overlap, it can become difficult to determine which of the bands is contributing to the portion of the panchromatic band corresponding to the overlap. For example, it may be difficult to tell in the green-blue overlap if the intensity of the panchromatic band is coming from the blue data (e.g., from water) or the green data (e.g., from vegetation). So for images that can contain more blue than green (e.g., for a coastline) or more green than blue (e.g., for a forest), it is better to use image specific correction. This can be done by utilizing a linear least squares minimization technique. To do this, the system determines a best set of coefficients that minimizes the error between intensities of the synthetic panchromatic band and the actual panchromatic band. For the BGRN system described above, the system would minimize the error of:

$$P^2(x,y) = bB^2(x,y) + gG^2(x,y) + rR^2(x,y) + nN^2(x,y),$$

where P(x,y) is the intensity of the panchromatic band at pixel (x,y), and B(x,y), G(x,y), R(x,y) and N(x,y) are the intensities of the blue, green, red and near red bands in the multispectral image blocks at pixel (x,y), respectively. Generally, for an n-dimensional color space, the equation is given by:

$$P_{synth}^2(x, y) = \sum_{i=1}^{n} c_i MS_i^2(x, y),$$

where $c_i$ is the spectrum specific coefficient for the i-th band in the multispectral image block.

By finding the values of b, g, r, and n that minimize the error in this equation, the best fit contribution of each band in the multispectral image is found. Then when the intensity is scaled, the ratio of the components stays the same as the original image, keeping the color reproduction as close to the original image as possible. For large images, it is sufficient to sample a small representative subset of pixels so that the least squares fit can proceed quickly. In one embodiment, image data for a particular image includes multiple resolutions of the image data (either in the same file or in related files). In an embodiment utilizing a single file for multiple resolutions, the file may include index information that identifies where in the file each of the various resolutions can be found. In an embodiment that utilizes multiple files, the relationship between files may be stored in a file or database, or the file naming convention of the files may enable the various resolutions to be found programmatically. For example, an original "coastline0012.png" having a resolution of 10000×10000 may be related to smaller versions "coastline0012.1024×1024.png" and "coastline0012.2048×2048.png" having resolutions of 1024×1024 and 2048×2048, respectively.

As an optional step 135 (FIG. 3), it is also possible to sharpen the image data as part of or in addition to the intensity matching step. The difference between $P_{synth}$ and the real panchromatic band (P) is the change in intensity needed to adjust the multispectral bands to match the P panchromatic band. By adjusting how much of that is added back in, the amount of sharpening can be controlled according to:

$$I'^2(x,y) = I^2(x,y) + \beta[P^2(x,y) - P_{synth}^2(x,y)],$$

where I'(x, y) is the new intensity of the multispectral image block, I(x, y) is the intensity of the multispectral image block, P(x, y) is the intensity of the panchromatic image block, and $P_{synth}(x, y)$ is the predicted intensity of the panchromatic image block given from the multispectral image block at each pixel (x,y). The sharpening coefficient, $\beta$, determines the level of sharpening applied to the image block. If $\beta=0$, no sharpening occurs and the multispectral image block remains unchanged. If $\beta=1$, the multispectral image block is as sharp as the panchromatic image block with colors as close to the multispectral image as possible. For value of $\beta$ greater than 1, the multispectral image block is made even sharper at the expense of accurate color reproduction.

Figure 5:
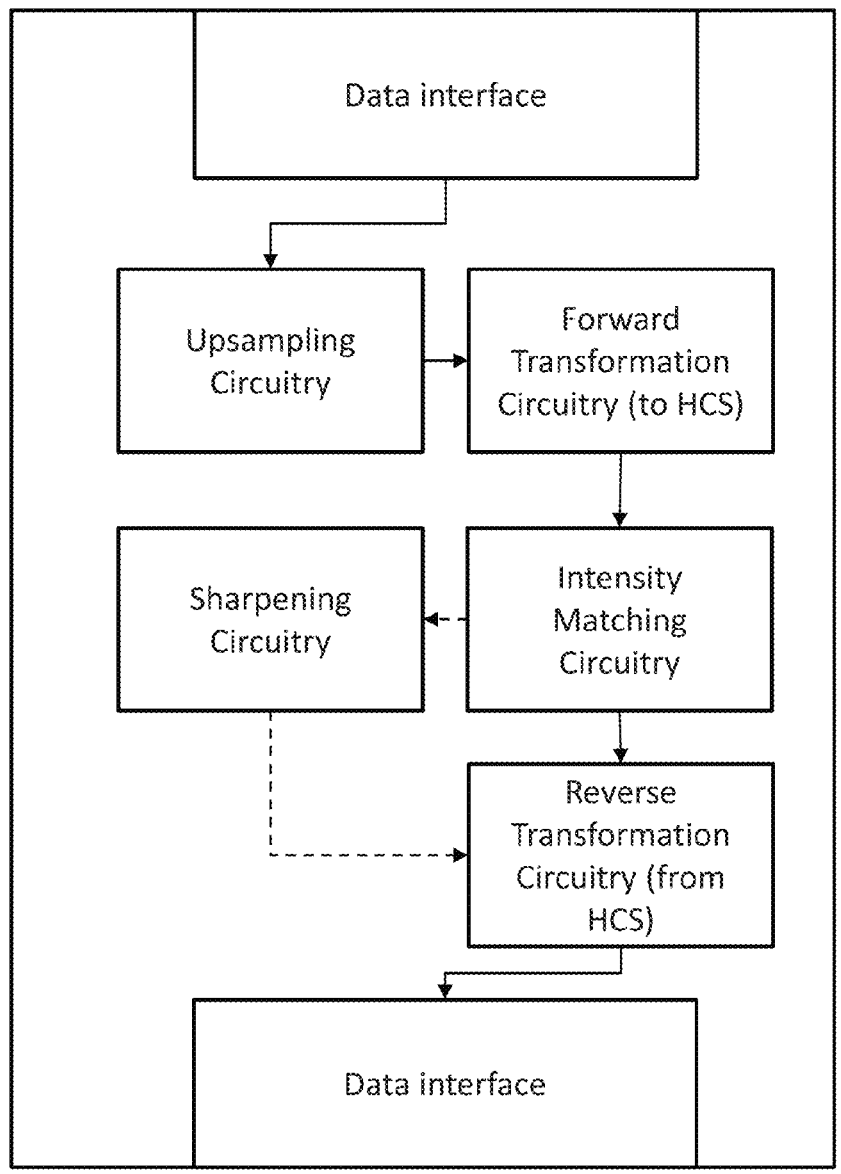
FIG. 5 is a block diagram of a system according to the present invention including circuitry for performing the steps of FIG. 3.

The hyperspherical color space pan-sharpening techniques described above can be implemented using a variety of embodiments that utilize varying amounts of circuitry and programmable instructions, as shown in FIG. 5. In one embodiment, the techniques are performed using special-purpose circuitry that has been designed to perform all the steps of the HCS pan sharpening technique as well as reading the original data and writing the combined data through one or more data interfaces. In another embodiment, the techniques are performed using general-purpose circuitry (e.g., a processor such as a microprocessor, system-on-a-chip, a custom processor, a field programmable gate array, etc.) that accesses at least one memory containing program instructions designed to control the processor to perform all the steps of the HCS pan sharpening technique. In yet another embodiment, the techniques are performed using (1) special-purpose circuitry (e.g., ASICs, one-time programmable FPGA, a printed circuit board) that has been designed to perform some of the steps of the HCS pan sharpening technique and (2) general-purpose circuitry (e.g., a processor such as a microprocessor, system-on-a-chip, a custom processor, a reprogrammable field programmable gate array, etc.) that accesses at least one memory containing program instructions designed to control the processor to perform some of the steps of the HCS pan sharpening technique. The at least one computer memory storing the program instructions may be either rewritable memory or a one-time programmable memory. In addition, a processor-based system typically also includes an external rewritable memory for storing temporary results during the execution of the program instructions, although it is possible to utilize only internal rewriteable memory for the storage of those temporary results. As would be understood by those of ordinary skill in the art, the number of steps performed by special-purpose circuitry versus general-purpose circuitry is a matter of design choice related to factors such as, but not limited to, initial design cost, reprogrammability, speed, extensibility, etc.

Thus, the sharpening of multiple bands is possible and useful. Some examples of different band combinations displayed in RGB format are shown in FIGS. 6-11, and it can be seen that image combining is not limited to only those multispectral bands which offer significant spectral overlap with the panchromatic band. Such a capability is achieved because the HCS technique models the data statistically instead of employing a physical model involving the exact spectral bandpasses of the sensor in question. Thus the spectral overlap of the bands is not a strong determining factor in the quality of the combined images. FIGS. 6-11 include the following band combinations: red-green-blue, red edge-green-blue, NIR2-green-blue, yellow-green-blue, NIR1-green-blue and red-green-coastal, respectively.

As described above, the processes and techniques can be implemented in parallel as well as serially. Generally, except for the calculation of statistical information across an entire image (or across a thumbnail image), the image combination techniques have the benefit that pixel (x1,y1) is independent of pixel (x2,y2) for all pixels. As a result, any pixel may be processed independently of any other pixel. This leads to parallelization where the image may be split into n sub images (or blocks) on an n-processor (or n-threaded) machine and each sub image may be processed separately.

In one embodiment, a combination of a pipeline and a "parallel-for" technique is used. The pipeline includes three main steps:
  Read a block of data from the file(s) (e.g., read a scanline (or several scanlines) or some other block from both the panchromatic image and the multispectral image).
  Process the chunk of data. In this step each pixel is converted to HCS, the sharpening is applied, and the new pixel is converted back to the native color space.
  Save the chunk of data. In this step, the data is written to a new combined file.

The benefits of the pipeline process are that all the steps can be happening at the same time, e.g., while one processor is reading a block of data, another can be processing a block that was already read, and yet another can be saving a block that was already processed. This effectively eliminates the time wasted while waiting for the data to be read from or written to the disk.

In addition to the parallelization introduced from the pipeline, the second step of the pipeline can be parallelized even more. Each pixel in the chunk of data to be processed is independent of each other, so the block of data can be split into n pieces for n processors, speeding up the computation by a factor of n. In practice, near perfect scalability may be reached with this pipeline/parallel-for technique.

In order to judge the operation of the technique quantitatively, a number of methods can be used to assess both the spectral and spatial quality of the pan-sharpened image. However, there is currently no consensus in the literature (Li 2000) on the best quality index for pan-sharpening. See Li, J., Spatial quality evaluation of fusion of different resolution images, ISPRS Int. Arch. Photogramm. Remote Sens., vol. 33, no. B2-2, pp-339-346, 2000, incorporated herein by reference. Similarly, Strait, M., Rahmani, S., Markurjev, D., Wittman, T. August 2008. Evaluation of Pan-Sharpening Methods, Technical Report, UCLA Department of Mathematics discloses a survey of many of the methods employed in the literature. One of these methods is the Wang-Bovic quality index as described in Wang, Z., Bovic, A., A Universal Image Quality Index, IEEE Signal Processing Letters, Vol 9, No 3, March 2002, also incorporated herein by reference. The utility of the Wang-Bovic quality index for evaluating pan-sharpening performance is demonstrated in Borel, C., Spencer, C., Ewald, K., Wamsley, C. Novel methods for panchromatic sharpening of multi/hyper-spectral image data, Jul. 22, 2009, SPIE conference paper, the contents of which are incorporated by reference. The Wang-Bovic quality index for two images f and g is defined as:

$$Q_{WB} = \frac{\sigma_{fg}}{\sigma_f \sigma_g} \frac{2\mu_f \mu_g}{(\mu_f + \mu_g)} \frac{2\sigma_f \sigma_g}{(\mu_f^2 + \mu_g^2)(\sigma_f + \sigma_g)} \qquad \text{Equation 25}$$

where the variances are represented as $\sigma_f$ and $\sigma_g$ and the means are represented as $\mu_f$ and $\mu_g$. Following Wang-Bovic, the first term is the spatial cross correlation between f and g, the second term is a comparison of the means between f and g, and the third term is a comparison of the contrasts. The index goes between −1 and 1. When the image f is considered to be the original, unaltered image, and the image g is considered to be the altered image, then QWB is considered to measure the quality of g with respect to f.

In order to apply the Wang-Bovic quality index, one must have a reference image. However, no reference image exists at the pan-sharpened resolution. Invariably one must downsample the pan sharpened image to the original multispectral resolution, which allows direct computation of the quality index. The $Q_{WB}$ can be computed at a certain scale, or block size. Following Borel a block size of approximately ¼ of the image is used.

The Wang-Bovic quality index can be computed for each band in the original multispectral image, producing a vector of values. The quantity $Q_\lambda$ can be defined as follows:

$$Q_\lambda = [Q_{WB}(MS_1, PS_1), Q_{WB}(MS_2, PS_2), \ldots Q_{WB}(MS_N, PS_N)] \qquad \text{Equation 26}$$

where MS indicates the original multispectral band in the image, and PS indicates the pan-sharpened band (downsampled to the multispectral resolution), and N is the number of bands in the image.

However, the computation of $Q_{WB}$ alone may not be sufficient to fully evaluate pan-sharpening quality. Since the computation is carried out at the same spatial resolution as the multispectral image, the $Q_{WB}$ index cannot evaluate the spatial quality of the image at the panchromatic resolution.

For evaluating the spatial performance of a pan-sharpening technique, computing the cross correlation of the original panchromatic band with each band of the pan-sharpened image provides an effective measure of spatial quality. The cross correlation of two signals A and B is defined as:

$$CC(A, B) = \frac{\Sigma(A_i - \mu_A)(B_i - \mu_B)}{\sqrt{\Sigma(A_i - \mu_A)^2 \Sigma(B_i - \mu_B)^2}} \qquad \text{Equation 27}$$

where $\mu_A$ and $\mu_B$ are the means of signals A and B, and the summation runs over all elements of each signal.

The cross correlation can be computed between the panchromatic band and every band in the pan-sharpened image producing a vector of values. The quantity CCl is defined as:

$$CC_\lambda = [CC(Pan, PS_1), CC(Pan, PS_2), \ldots, CC(Pan, PS_N)] \qquad \text{Equation 28}$$

where Pan indicates the panchromatic band, and PS indicates the pan-sharpened band, with the subscript indicating the band index, and N is the number of bands in the image.

A two-part quality metric is then used measuring spectral quality and spatial quality. The spectral quality is the Wang-Bovic quality index and the spatial quality is simply the cross correlation. The quantity QPS is defined as follows:

$$Q_{PS} = \left(\frac{1}{N}\sum_{\lambda=1}^{N} Q_\lambda\right) \times \left(\frac{1}{N}\sum_{\lambda=1}^{N} CC_\lambda\right) \qquad \text{Equation 29}$$

where $Q_\lambda$ and $CC_\lambda$ are defined above. A good pan-sharpening quality index will provide a natural mechanism to evaluate and compare the performance of different pan-sharpening techniques. As an example, four different pan-sharpening techniques are applied to the same dataset and QPS is computed for each technique, and the results are compared and contrasted as shown below in Table 1.

TABLE 1

| Technique | $Q_{red}$ | $Q_{green}$ | $Q_{blue}$ | $CC_{red}$ | $CC_{green}$ | $CC_{blue}$ | Ave($Q_\lambda$) | Ave($CC_\lambda$) | $Q_{PS}$ |
|---|---|---|---|---|---|---|---|---|---|
| PCA | 0.891 | 0.878 | 0.898 | 0.847 | 0.859 | 0.816 | 0.889 | 0.841 | 0.747 |
| GS | 0.898 | 0.886 | 0.900 | 0.882 | 0.869 | 0.853 | 0.895 | 0.868 | 0.777 |
| HIS | 0.920 | 0.860 | 0.780 | 0.960 | 0.996 | 0.984 | 0.853 | 0.980 | 0.836 |
| HCS Smart | 0.929 | 0.904 | 0.878 | 0.929 | 0.946 | 0.909 | 0.904 | 0.928 | 0.839 |

The four techniques compared are the Hue-Intensity-Saturation (HIS) technique, the Principal Components Analysis (PCA) technique, the Gramm-Schmidt (GS) technique, and the HCS smart technique. Analyzing the table it can be seen that each technique's performance can be ranked quantitatively in terms of the QPS metric. The PCA technique scores the lowest of the four, and is the least sharp of all the technique. The GS technique is sharper than PCA, and retains the spectral quality better than PCA, and thus scores higher than PCA. The spectral quality for the HIS technique is very poor, with the blue band being the worst (0.78), but the spatial quality is quite high (0.98). Thus, the poor spectral performance is offset by the excellent spatial performance and the technique scores higher than both PCA and GS. The HCS technique scores high in both spectral and spatial performance and scores the highest out of all four techniques.

Thus spectrally speaking, HCS produces the best result, followed closely by GS and PCA, while HIS produces the worst result. Spatially speaking, HIS is the sharpest technique, followed by HCS, then GS, then PCA. Overall the HCS technique maintains the best balance between spectral and spatial quality of the 4 techniques.

Referring to FIGS. 12-17, it can be seen that the HIS technique produces sharp imagery and visually speaking looks as sharp as the panchromatic image, but there is an overall blue color to the vegetation that looks very different from the original multispectral image. The PCA, GS, and HCS techniques all exhibit much better color recovery than the HIS technique.

The PCA technique exhibits some visible artifacts, notably some discoloration around the white building near the top right, and the overall result is blurrier than the original pan image. The GS technique has fewer artifacts than PCA, but still exhibits some discoloration around the white building near the top right. The overall result looks sharper than the PCA result, but is not as sharp as the panchromatic image. The HCS result exhibits no discoloration around the white building near the top right, and exhibits the fewest visible artifacts. The HCS result is sharp and looks nearly as sharp as the panchromatic image. Thus, the pan-sharpened quality index correlates with qualitative observations made concerning the imagery and is a useful measure of pan-sharpening performance.

Additional experiments evaluated and compared the performance of the HCS smart technique against both the GS and PCA techniques available in ENVI. Ten scenes were collected with the WV-2 satellite from a variety of different types of land cover, including Desert, Urban, Coastal, Forest, Rock, and Snow scenes. Each image measured 10,000 pixels by 10,000 lines. All the WV-2 imagery was ordered as Pan-MS1-MS2 bundle products. In this configuration the panchromatic and multispectral imagery are stored in separate image files. The WV-2 multispectral data, when ordered in this configuration, contains the bands ordered by increasing wavelength, and the band order for a Pan-MS1-MS2 product is listed in Table 2.

TABLE 2

| Band name | Band index | Spectral Characteristics (nm) |
| --- | --- | --- |
| Coastal | 1 | 400-450 |
| Blue | 2 | 450-510 |
| Green | 3 | 510-580 |
| Yellow | 4 | 585-625 |
| Red | 5 | 630-690 |
| Red Edge | 6 | 705-745 |
| Near IR 1 | 7 | 770-895 |
| Near IR 2 | 8 | 860-1040 |

The data was prepared for pan-sharpening using the following process. The multispectral data was upsampled to the same resolution as the panchromatic resolution (0.5 m) using a bilinear resampling kernel. This kernel is used to suppress high frequency spatial artifacts in the upsampled multispectral imagery that can cause visual artifacts in the pan-sharpened imagery. No explicit registration step was performed to align the panchromatic and multispectral data. The imagery was pan-sharpened using an HCS statistical technique (of Equations 23 and 24), the PCA technique, and the Gramm-Schmidt technique. The spatial and spectral quality indices were then computed in an automated fashion. The results of the experiment are presented in Table 3.

TABLE 3

| Land Cover Type | PCA | | | GS | | | HCS | | |
| --- | --- | --- | --- | --- | --- | --- | --- | --- | --- |
| | $Q_\lambda$ | QCC | QPS | $Q_\lambda$ | QCC | QPS | $Q_\lambda$ | QCC | QPS |
| Desert | −0.67 | −0.85 | 0.56 | 0.94 | 0.84 | 0.8 | 0.83 | 0.94 | 0.78 |
| Urban | 0.94 | 0.78 | 0.73 | 0.94 | 0.79 | 0.74 | 0.82 | 0.9 | 0.74 |
| Desert | 0.96 | 0.98 | 0.94 | 0.96 | 0.98 | 0.95 | 0.96 | 0.98 | 0.94 |
| Coastal | 0.46 | 0.15 | 0.07 | 0.92 | 0.7 | 0.65 | 0.9 | 0.73 | 0.65 |
| Snow | −0.77 | −0.96 | 0.74 | 0.98 | 0.96 | 0.94 | 0.96 | 0.99 | 0.95 |
| Forest | 0.92 | 0.86 | 0.8 | 0.94 | 0.87 | 0.82 | 0.92 | 0.88 | 0.8 |
| Rocks | 0.85 | 0.9 | 0.76 | 0.85 | 0.9 | 0.76 | 0.6 | 0.97 | 0.59 |
| Desert | 0.76 | 0.98 | 0.74 | 0.75 | 0.98 | 0.74 | 1 | 0.98 | 0.97 |
| Desert | −0.6 | −0.87 | 0.52 | 0.91 | 0.88 | 0.81 | 0.83 | 0.93 | 0.77 |
| Flood Basin | 0.93 | 0.91 | 0.84 | 0.93 | 0.92 | 0.86 | 0.91 | 0.94 | 0.85 |
| Average | 0.38 | 0.29 | 0.67 | 0.91 | 0.88 | 0.805 | 0.87 | 0.92 | 0.805 |

As shown in Table 3, the performance of the PCA technique is widely variable, often producing negative correlations when compared to the input multispectral or input panchromatic images (see the 1st, 5th, and 9th rows in the table). This is assumed to be due to a significant amount of energy being distributed into other bands for these scenes rather than just the 1st band of the principal components transform, a situation which is not modeled by the PCA sharpening technique. Note that the technique is not penalized by the quality index if both $Q_\lambda$ and $CC_\lambda$ are negative, as is the case for all the PCA examples that show negative spectral or spatial quality indices. The Gramm-Schmidt technique shows much better performance than the PCA technique over all cover types, and shows no evidence of negative correlations. This is due to the fact that the GS technique models the input bands in a better fashion than PCA does, and is better equipped to handle histograms in which one multispectral component may overwhelm the other components. The HCS technique also performs well over all the input scenes (especially Desert, row 8). The overall quality index of HCS is tied with that of Gramm-Schmidt. It can be seen that GS appears to be stronger spectrally (0.91 versus 0.87) while the HCS technique appears to be stronger spatially (0.92 versus 0.88). Visual comparisons of the images confirm this observation regarding the sharpness as shown in FIGS. 12-17.

The above system can be used in either batch mode or on-the-fly mode. In batch mode, a series of images are specified for processing and the system combines specified panchromatic images with correspondingly specified multispectral images. The images in their entirety or specified portions of the images (e.g., by specifying a rectangle bounded by (x1,y1) and (x2,y2)) can be processed in batch mode.

Alternatively, a graphical user interface that provides on-the-fly processing can also be used. On-the-fly pansharpening can be used to selectively sharpen only those portions of the image which are of interest to the user. The advantage to the user is a potentially large savings in time since the user does not need to sharpen the entire image, only the portion of interest. A selected region of interest can be used as a "preview" window in which the results will be previewed before they are actually applied to the whole image.

In one such embodiment, the user selects a high resolution panchromatic image and the lower resolution multispectral image(s) using a display tool which is capable of displaying different images as layers, in which one layer sits on top of another. The user then defines a region of interest (ROI) on the display, where preferably the ROI is a rectangle which can be moved and resized over the entirety of or a thumbnail of at least one of the panchromatic image and one of the multispectral images. In most situations, it is expected that the whole panchromatic image will be too large to fit on a screen at its highest resolution, so the use of thumbnails or lower resolution images on the screen/display will be described below.

Once the ROI has been defined, on the fly pan-sharpening generally proceeds as described below. First, portions of both the panchromatic (PAN) and the multispectral (MS) image(s) that intersect the ROI are read by the system. Second, the system gathers from an associated user interface (e.g., a dialog box) all the parameters necessary to perform the transformation (e.g., the sharpening coefficient ($\beta$), and the optional spectrum specific contribution coefficients (e.g., b, g, r, n for a 4-band MS image)). The spectrum specific coefficients may be (1) specified directly (e.g., by specifying their values in a text box or using a graphical control such as a slider), (2) read from a default configuration based on image source (e.g., by specifying a satellite type and optionally conditions under which the image was taken), and/or (3) calculated on the fly using the full resolution image or a thumbnail image of any resolution specified. (Although only the region of interest is processed for viewing on the screen initially, the user may select to have the whole image processed using the specified parameters when a resulting image for the ROI is acceptable. Thus, it is important that the ROI is operated on with parameters (e.g., statistical characteristics) that are applicable to the whole image, and not just the ROI. This prevents the image of the ROI from changing when the whole image is processed because the statistical characteristics of the whole image are likely to be different than the statistical characteristics of the ROI.)

Accordingly, in one embodiment the system sharpens a reduced resolution version of the entire image with modest dimensions (such as 1024×1024 so that the imagery can be processed in memory rather than in tiles. This assumes that the overall shape of the image histogram of the reduced resolution sharpened result is approximately equal to the overall shape of the image histogram of the full image sharpened result. In one embodiment, rather than linearly assigning colors on the displays to color ranges in the various bands, the system can instead be configured to generate and utilize an image histogram that is used to create a color look-up table (or other image data converter) that "stretches" or spreads out how colors in the image are converted to colors shown on the display (e.g., thereby avoiding overly dark or saturated images).

Third, the multispectral imagery is upsampled to match the spatial resolution of the panchromatic image (PAN), resulting in $MS_{upsample}$. The imagery is then sharpened using the HCS techniques described above based on PAN, $MS_{upsample}$, and the sharpening coefficient ($\beta$). That is: PANSHARP=F(PAN, $MS_{upsample}$, $\beta$).

Fourth, the sharpened image PANSHARP is displayed on the display device using the derived histogram.

If the user moves the ROI to a different place in the image, the images may need to be re-read, and the process is repeated. If, however, the user only modifies the sharpening coefficient ($\beta$), then only the third and fourth steps need to be re-run.

Figure 18:
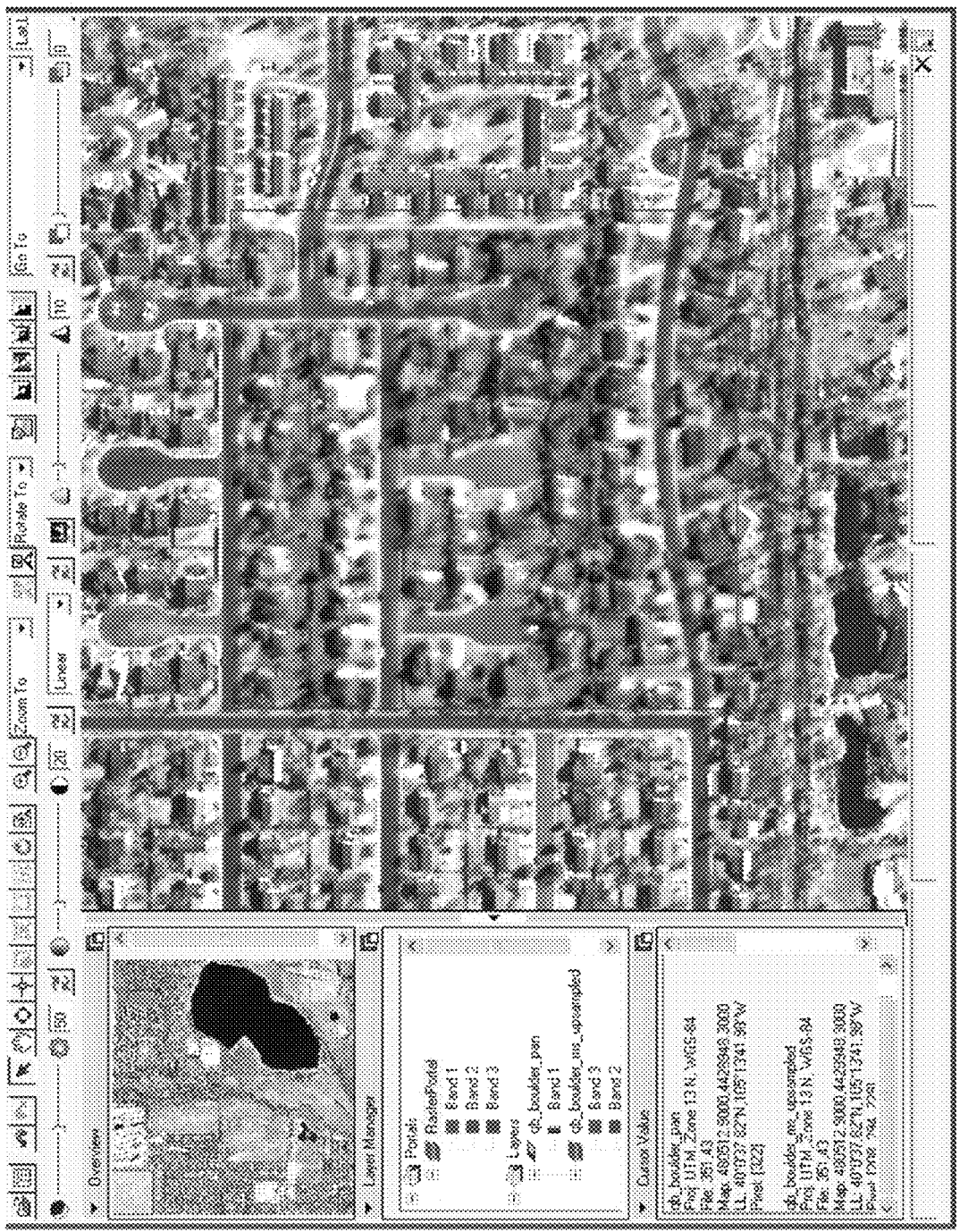
FIG. 18 is an exemplary user interface for processing panchromatic and multispectral images.
Figure 19:
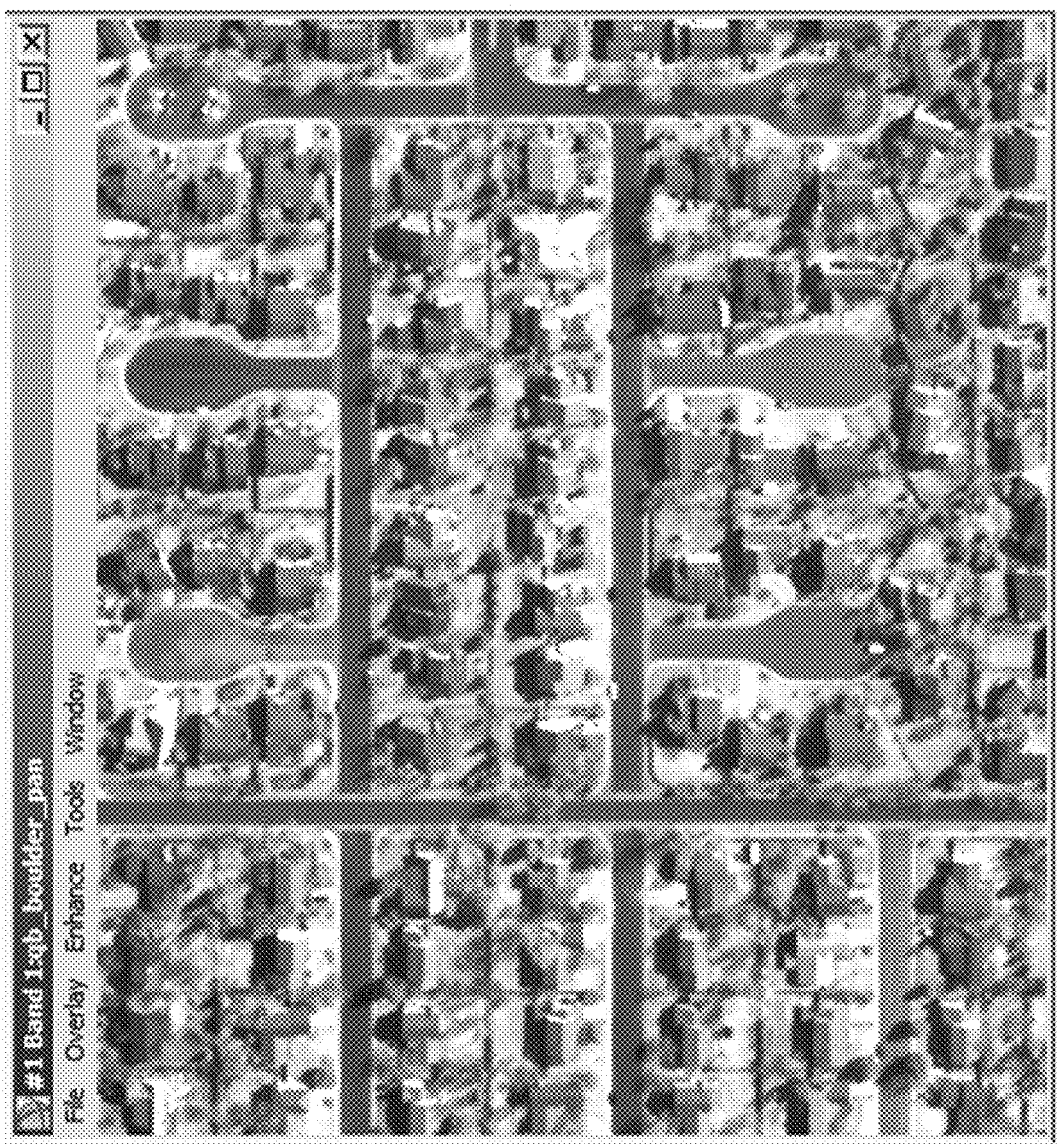
FIG. 19 is a panchromatic image block corresponding to a region of interest (ROI) that has been selected (e.g., using the interface of FIG. 18)
Figure 20:
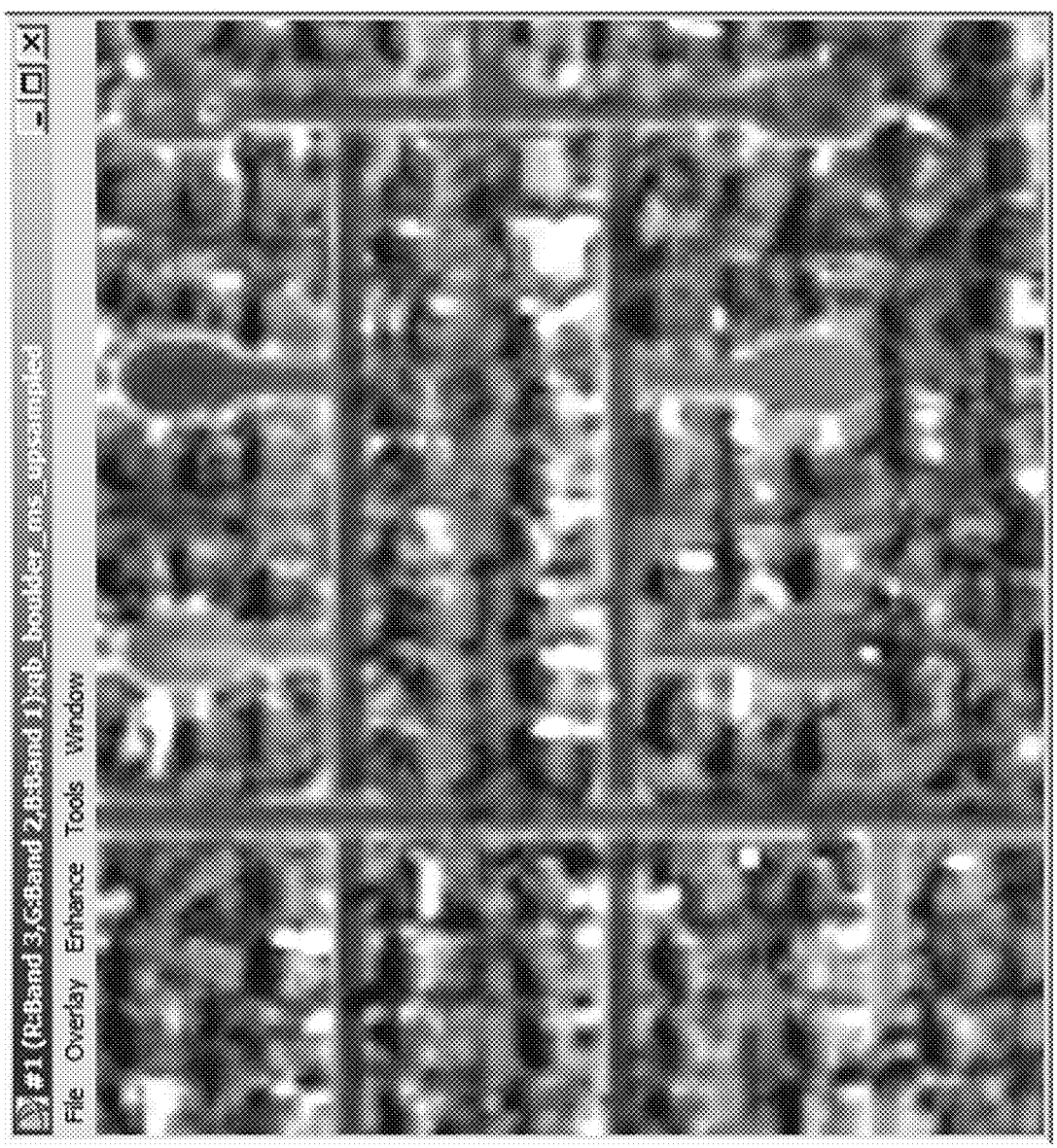
FIG. 20 is a BGRN multispectral image block that is cogeolocated with the panchromatic image block of FIG. 19.

FIG. 18 is an exemplary user interface for processing images according to the methods described herein. FIG. 19 shows a panchromatic image block corresponding to the region of interest (ROI) that has been selected (e.g., using the interface of FIG. 18). The panchromatic image has a resolution of approximately 0.6 m/pixel. FIG. 20 shows the corresponding BGRN multispectral image block (with a resolution of approximately 2.4 m/pixel).

Figure 21:
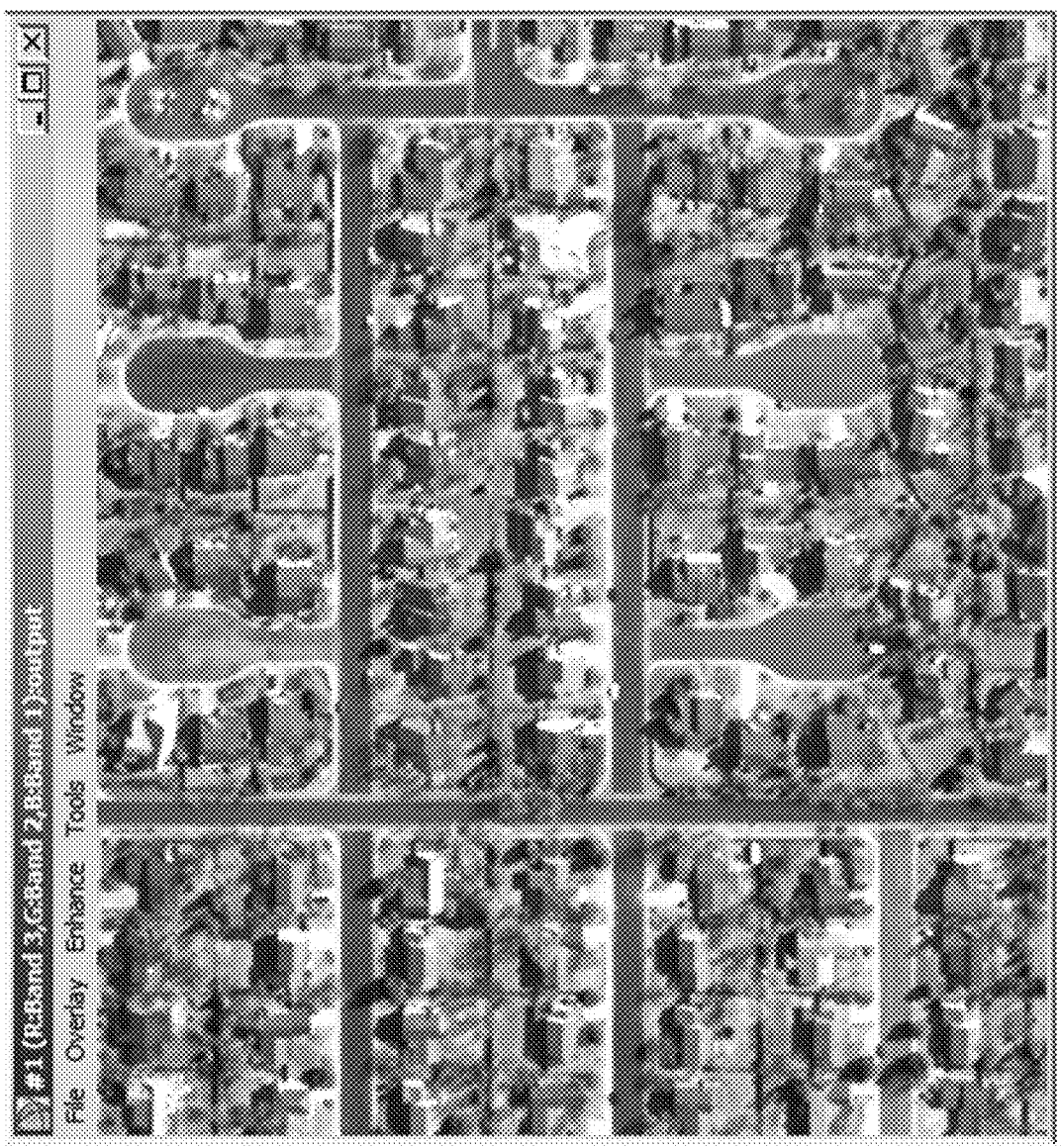
FIG. 21 is a resulting image achieved by combining the panchromatic image block of FIG. 19 with an upsampled multispectral image block of FIG. 20 using a first intensity matching technique.
Figure 22:
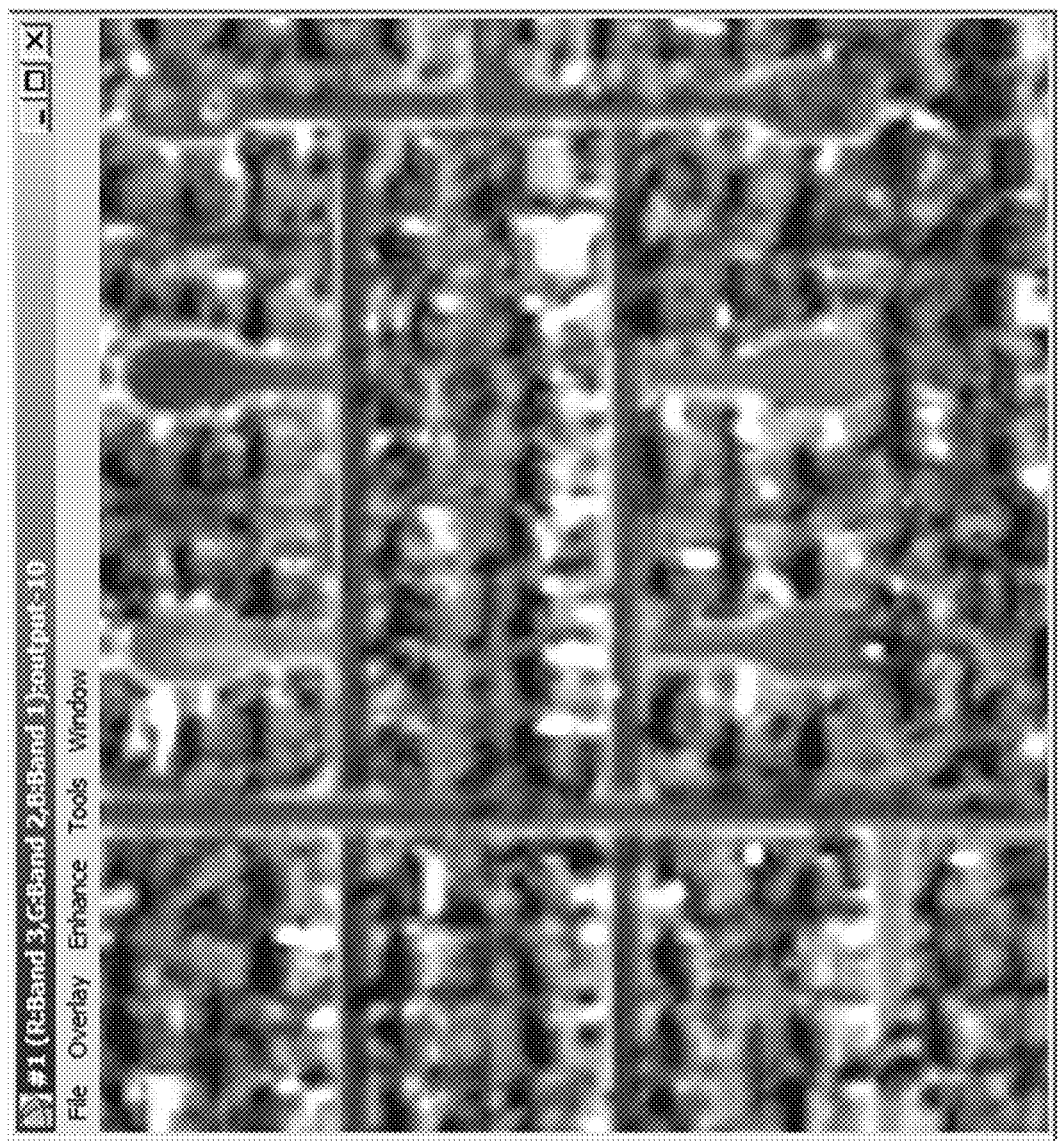
FIGS. 22-26 are resulting images achieved by combining the panchromatic image block of FIG. 19 with an upsampled multispectral image block of FIG. 20 where spectral coefficients are chosen to be b=0.67, g=−0.019, r=1.21 and n=0.68 and β is selected to be 0, 0.5, 1.0, 1.5 and 3.0, respectively.
Figure 23:
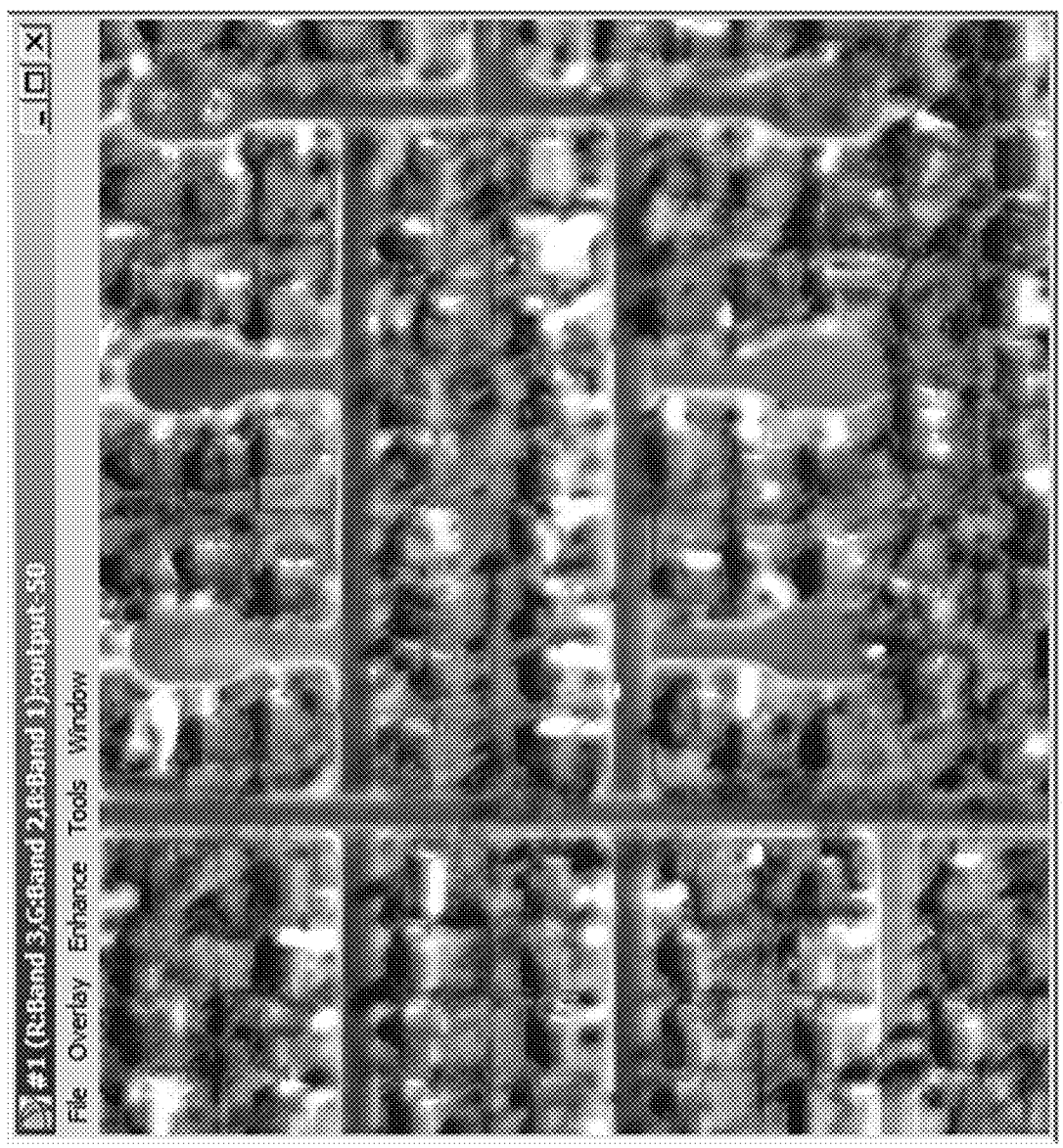
Figure 24:
Figure 25:
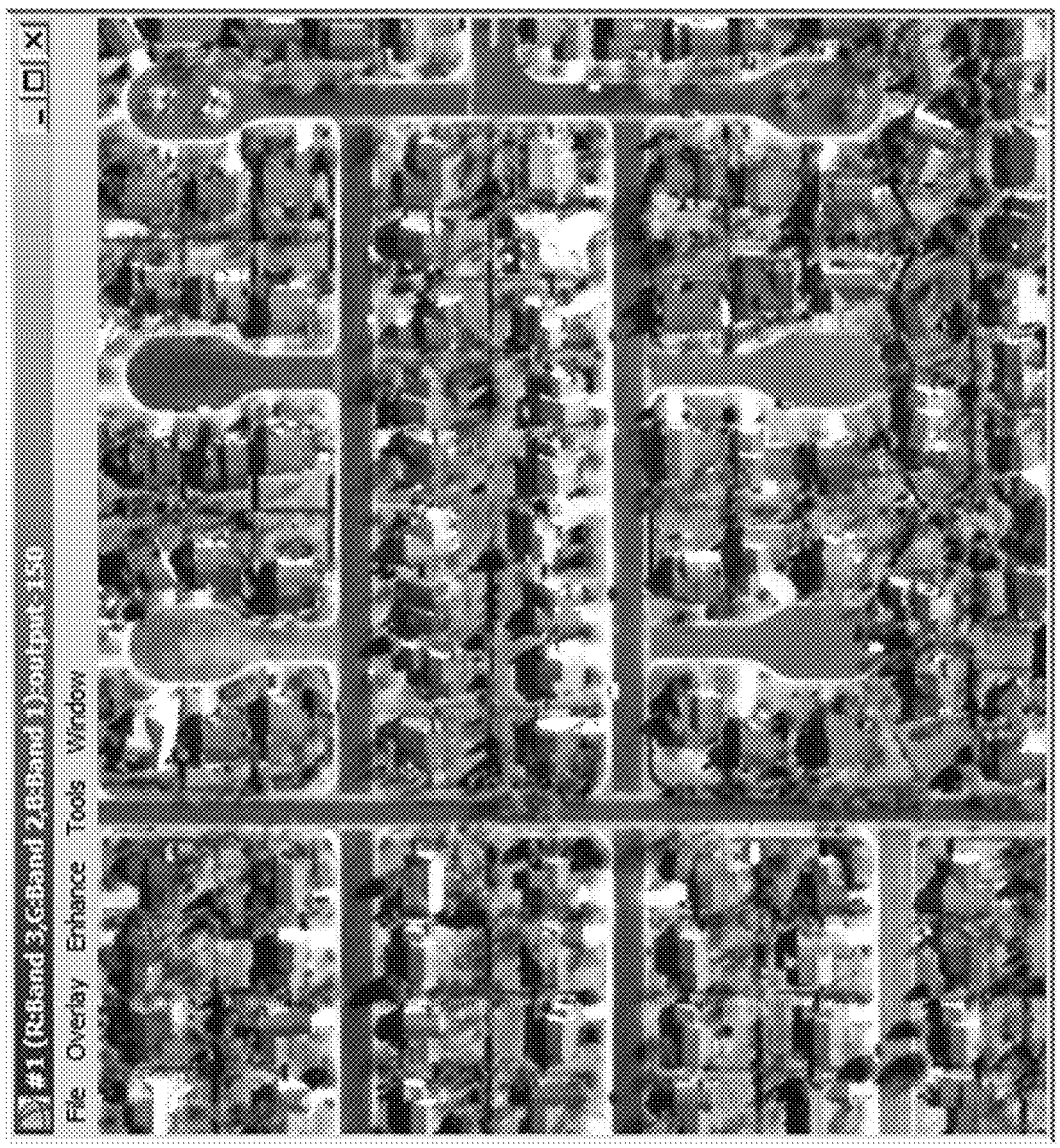
Figure 26:

FIG. 21 shows a resulting image of where the panchromatic image block of FIG. 19 is combined with an upsampled multispectral image block of FIG. 20 and $I_{adj}(x, y)=P(x, y)$ such that no information about the overlap of the multispectral bands is used. Some color distortion occurs since each multispectral band does not actually contribute equally to the panchromatic intensity.

FIGS. 22-26 show resulting images where spectral coefficients are chosen to be b=0.67, g=−0.019, r=1.21 and n=0.68 and $\beta$ is selected to be 0, 0.5, 1.0, 1.5 and 3.0, respectively.

While certain configurations of structures have been illustrated for the purposes of presenting the basic structures of the present invention, one of ordinary skill in the art will appreciate that other variations are possible which would still fall within the scope of the appended claims.

The invention claimed is:

1. An image processing system for combining at least a portion of a panchromatic image block at a first resolution with at least corresponding cogeolocated portions of n spectral band image blocks of a second resolution lower than the first resolution, the system comprising:
   circuitry for upsampling the corresponding portions of the n spectral band image blocks at the second resolution to form n upsampled spectral band image blocks, where n is an integer that is at least as large as four;
   circuitry for transforming the n upsampled spectral band image blocks to a hyperspherical color space to form hyperspherical color space image blocks including, for each pixel in the hyperspherical color space image block, a hyperspherical intensity and n−1 hyperspherical angles;
   circuitry for intensity matching the intensities of the hyperspherical color space image blocks with intensities of corresponding pixels in the panchromatic image block to form intensity adjusted hyperspherical color space image blocks; and
   circuitry for reverse transforming the intensity adjusted hyperspherical color space image blocks into n reverse transformed spectral band image blocks, wherein the circuitry for upsampling comprises circuitry for performing a zero order hold on the n spectral band image blocks of a second resolution to generate pixels at the first resolution.

2. An image processing system for combining at least a portion of a panchromatic image block at a first resolution with at least corresponding cogeolocated portions of n spectral band image blocks of a second resolution lower than the first resolution, the system comprising:
   circuitry for upsampling the corresponding portions of the n spectral band image blocks at the second resolution to form n upsampled spectral band image blocks, where n is an integer that is at least as large as four;

circuitry for transforming the n upsampled spectral band image blocks to a hyperspherical color space to form hyperspherical color space image blocks including, for each pixel in the hyperspherical color space image block, a hyperspherical intensity and n−1 hyperspherical angles;

circuitry for intensity matching the intensities of the hyperspherical color space image blocks with intensities of corresponding pixels in the panchromatic image block to form intensity adjusted hyperspherical color space image blocks; and circuitry for reverse transforming the intensity adjusted hyperspherical color space image blocks into n reverse transformed spectral band image blocks, wherein the circuitry for upsampling comprises circuitry for performing linear interpolation on the n spectral band image blocks of a second resolution to generate pixels at the first resolution.

3. An image processing system for combining at least a portion of a panchromatic image block at a first resolution with at least corresponding cogeolocated portions of n spectral band image blocks of a second resolution lower than the first resolution, the system comprising:

circuitry for upsampling the corresponding portions of the n spectral band image blocks at the second resolution to form n upsampled spectral band image blocks, where n is an integer that is at least as large as four;

circuitry for transforming the n upsampled spectral band image blocks to a hyperspherical color space to form hyperspherical color space image blocks including, for each pixel in the hyperspherical color space image block, a hyperspherical intensity and n−1 hyperspherical angles;

circuitry for intensity matching the intensities of the hyperspherical color space image blocks with intensities of corresponding pixels in the panchromatic image block to form intensity adjusted hyperspherical color space image blocks; and circuitry for reverse transforming the intensity adjusted hyperspherical color space image blocks into n reverse transformed spectral band image blocks, wherein the circuitry for upsampling comprises circuitry for performing cubic interpolation on the n spectral band image blocks of a second resolution to generate pixels at the first resolution.

4. An image processing system for combining at least a portion of a panchromatic image block at a first resolution with at least corresponding cogeolocated portions of n spectral band image blocks of a second resolution lower than the first resolution, the system comprising:

circuitry for upsampling the corresponding portions of the n spectral band image blocks at the second resolution to form n upsampled spectral band image blocks, where n is an integer that is at least as large as four;

circuitry for transforming the n upsampled spectral band image blocks to a hyperspherical color space to form hyperspherical color space image blocks including, for each pixel in the hyperspherical color space image block, a hyperspherical intensity and n−1 hyperspherical angles;

circuitry for intensity matching the intensities of the hyperspherical color space image blocks with intensities of corresponding pixels in the panchromatic image block to form intensity adjusted hyperspherical color space image blocks; and circuitry for reverse transforming the intensity adjusted hyperspherical color space image blocks into n reverse transformed spectral band image blocks, wherein the circuitry for upsampling comprises circuitry for performing a non-linear interpolation on the n spectral band image blocks of a second resolution to generate pixels at the first resolution.

5. An image processing system for combining at least a portion of a panchromatic image block at a first resolution with at least corresponding cogeolocated portions of n spectral band image blocks of a second resolution lower than the first resolution, the system comprising:

circuitry for upsampling the corresponding portions of the n spectral band image blocks at the second resolution to form n upsampled spectral band image blocks, where n is an integer that is at least as large as four;

circuitry for transforming the n upsampled spectral band image blocks to a hyperspherical color space to form hyperspherical color space image blocks including, for each pixel in the hyperspherical color space image block, a hyperspherical intensity and n−1 hyperspherical angles;

circuitry for intensity matching the intensities of the hyperspherical color space image blocks with intensities of corresponding pixels in the panchromatic image block to form intensity adjusted hyperspherical color space image blocks; and circuitry for reverse transforming the intensity adjusted hyperspherical color space image blocks into n reverse transformed spectral band image blocks, wherein the circuitry for intensity matching the intensities of the hyperspherical color space image blocks with the intensities of corresponding pixels in the panchromatic image block comprises circuitry for filtering at least the intensities of corresponding pixels in the panchromatic image block to form the intensity adjusted hyperspherical color space image blocks.

6. An image processing system for combining at least a portion of a panchromatic image block at a first resolution with at least corresponding cogeolocated portions of n spectral band image blocks of a second resolution lower than the first resolution, the system comprising:

circuitry for upsampling the corresponding portions of the n spectral band image blocks at the second resolution to form n upsampled spectral band image blocks, where n is an integer that is at least as large as four;

circuitry for transforming the n upsampled spectral band image blocks to a hyperspherical color space to form hyperspherical color space image blocks including, for each pixel in the hyperspherical color space image block, a hyperspherical intensity and n−1 hyperspherical angles;

circuitry for intensity matching the intensities of the hyperspherical color space image blocks with intensities of corresponding pixels in the panchromatic image block to form intensity adjusted hyperspherical color space image blocks; and circuitry for reverse transforming the intensity adjusted hyperspherical color space image blocks into n reverse transformed spectral band image blocks, wherein the circuitry for intensity matching the intensities of the hyperspherical color space image blocks with the intensities of corresponding pixels in the panchromatic image block comprises circuitry for smoothing at least the intensities of the corresponding pixels in the panchromatic image block to form the intensity adjusted hyperspherical color space image blocks.

7. An image processing system for combining at least a portion of a panchromatic image block at a first resolution with at least corresponding cogeolocated portions of n spectral band image blocks of a second resolution lower than the first resolution, the system comprising:
- circuitry for upsampling the corresponding portions of the n spectral band image blocks at the second resolution to form n upsampled spectral band image blocks, where n is an integer that is at least as large as four;
- circuitry for transforming the n upsampled spectral band image blocks to a hyperspherical color space to form hyperspherical color space image blocks including, for each pixel in the hyperspherical color space image block, a hyperspherical intensity and n−1 hyperspherical angles;
- circuitry for intensity matching the intensities of the hyperspherical color space image blocks with intensities of corresponding pixels in the panchromatic image block to form intensity adjusted hyperspherical color space image blocks; and
- circuitry for reverse transforming the intensity adjusted hyperspherical color space image blocks into n reverse transformed spectral band image blocks, wherein the circuitry for intensity matching the intensities of the hyperspherical color space image blocks with the intensities of corresponding pixels in the panchromatic image block comprises circuitry for forming the intensity adjusted hyperspherical color space image blocks by filtering at least the intensities of corresponding pixels in the panchromatic image block using statistical characteristics of at least one of (a) the intensities of corresponding pixels in the panchromatic image block and (b) the intensities of the hyperspherical color space image blocks.

8. The image processing system as claimed in claim 7, wherein the statistical characteristics comprises at least one of (a) a mean of the square of the intensities of corresponding pixels in the panchromatic image block, (b) a standard deviation of the square of the intensities of corresponding pixels in the panchromatic image block, (c) a mean of the square of the intensities of the hyperspherical color space image blocks and (d) a standard deviation of the square of the intensities of the hyperspherical color space image blocks.

9. An image processing system for combining at least a portion of a panchromatic image block at a first resolution with at least corresponding cogeolocated portions of n spectral band image blocks of a second resolution lower than the first resolution, the system comprising:
- circuitry for upsampling the corresponding portions of the n spectral band image blocks at the second resolution to form n upsampled spectral band image blocks, where n is an integer that is at least as large as four;
- circuitry for transforming the n upsampled spectral band image blocks to a hyperspherical color space to form hyperspherical color space image blocks including, for each pixel in the hyperspherical color space image block, a hyperspherical intensity and n−1 hyperspherical angles;
- circuitry for intensity matching the intensities of the hyperspherical color space image blocks with intensities of corresponding pixels in the panchromatic image block to form intensity adjusted hyperspherical color space image blocks; and
- circuitry for reverse transforming the intensity adjusted hyperspherical color space image blocks into n reverse transformed spectral band image blocks, wherein the circuitry for intensity matching the intensities (I) of the hyperspherical color space image blocks with the intensities (P) of corresponding pixels in the panchromatic image block comprises circuitry for forming the intensity adjusted hyperspherical color space image blocks ($I_{adj}$) by calculating:

$$P'^2(x, y) = \frac{\sigma_i}{\sigma_p}(P(x, y)^2 - \mu_p + \sigma_p) + \mu_i - \sigma_i,$$

and $$I_{adj}(x, y) = \sqrt{P'^2(x, y)},$$

where $P^2(x,y)^2$ is the square of the intensity of the corresponding pixel at location (x,y) in the panchromatic image block, $\mu_p$ and $\sigma_p$ are the mean and standard deviation of the square of the intensities of the corresponding pixels in the panchromatic image block ($P^2$), respectively, and $\mu_i$ and $\sigma_i$ are the mean and standard deviation of h.

10. A processor-based method for combining at least a portion of a panchromatic image block at a first resolution with at least corresponding cogeolocated portions of n spectral band image blocks of a second resolution lower than the first resolution, the processor performing instructions stored in a computer memory to cause the processor to perform the method comprising:
- upsampling the corresponding portions of the n spectral band image blocks at the second resolution to form n upsampled spectral band image blocks, where n is an integer that is at least as large as four;
- transforming the n upsampled spectral band image blocks to a hyperspherical color space to form hyperspherical color space image blocks including, for each pixel in the hyperspherical color space image block, a hyperspherical intensity and n−1 hyperspherical angles;
- intensity matching the intensities of the hyperspherical color space image blocks with intensities of corresponding pixels in the panchromatic image block to form intensity adjusted hyperspherical color space image blocks; and
- reverse transforming the intensity adjusted hyperspherical color space image blocks into n reverse transformed spectral band image blocks, wherein the intensity matching the intensities of the hyperspherical color space image blocks with the intensities of corresponding pixels in the panchromatic image block comprises forming the intensity adjusted hyperspherical color space image blocks by filtering at least the intensities of corresponding pixels in the panchromatic image block using statistical characteristics of at least one of (a) the intensities of corresponding pixels in the panchromatic image block and (b) the intensities of the hyperspherical color space image blocks.

11. The processor-based method as claimed in claim 10, wherein the statistical characteristics comprises at least one of (a) a mean of the square of the intensities of corresponding pixels in the panchromatic image block, (b) a standard deviation of the square of the intensities of corresponding pixels in the panchromatic image block, (c) a mean of the square of the intensities of the hyperspherical color space image blocks and (d) a standard deviation of the square of the intensities of the hyperspherical color space image blocks.

12. A processor-based method for combining at least a portion of a panchromatic image block at a first resolution with at least corresponding cogeolocated portions of n spectral band image blocks of a second resolution lower than the first resolution, the processor performing instructions stored in a computer memory to cause the processor to perform the method comprising:
- upsampling the corresponding portions of the n spectral band image blocks at the second resolution to form n upsampled spectral band image blocks, where n is an integer that is at least as large as four;
- transforming the n upsampled spectral band image blocks to a hyperspherical color space to form hyperspherical color space image blocks including, for each pixel in the hyperspherical color space image block, a hyperspherical intensity and n−1 hyperspherical angles;
- intensity matching the intensities of the hyperspherical color space image blocks with intensities of corresponding pixels in the panchromatic image block to form intensity adjusted hyperspherical color space image blocks; and
- reverse transforming the intensity adjusted hyperspherical color space image blocks into n reverse transformed spectral band image blocks, wherein the intensity matching the intensities (I) of the hyperspherical color space image blocks with the intensities (P) of corresponding pixels in the panchromatic image block comprises forming the intensity adjusted hyperspherical color space image blocks ($I_{adj}$) by calculating:

$$P'^2(x, y) = \frac{\sigma_i}{\sigma_p}(P(x, y)^2 - \mu_p + \sigma_p) + \mu_i - \sigma_i,$$

and $$I_{adj}(x, y) = \sqrt{P'^2(x, y)},$$

where $P^2(x,y)^2$ is the square of the intensity of the corresponding pixel at location (x,y) in the panchromatic image block, $\mu_p$ and $\sigma_p$ are the mean and standard deviation of the square of the intensities of the corresponding pixels in the panchromatic image block ($P^2$), respectively, and $\mu_i$ and $\sigma_i$ are the mean and standard deviation of $I^2$.

* * * * *